Nov. 10, 1931.  J. L. HECHT  1,831,661
METHOD OF MAKING METAL WHEELS
Filed Feb. 4, 1930
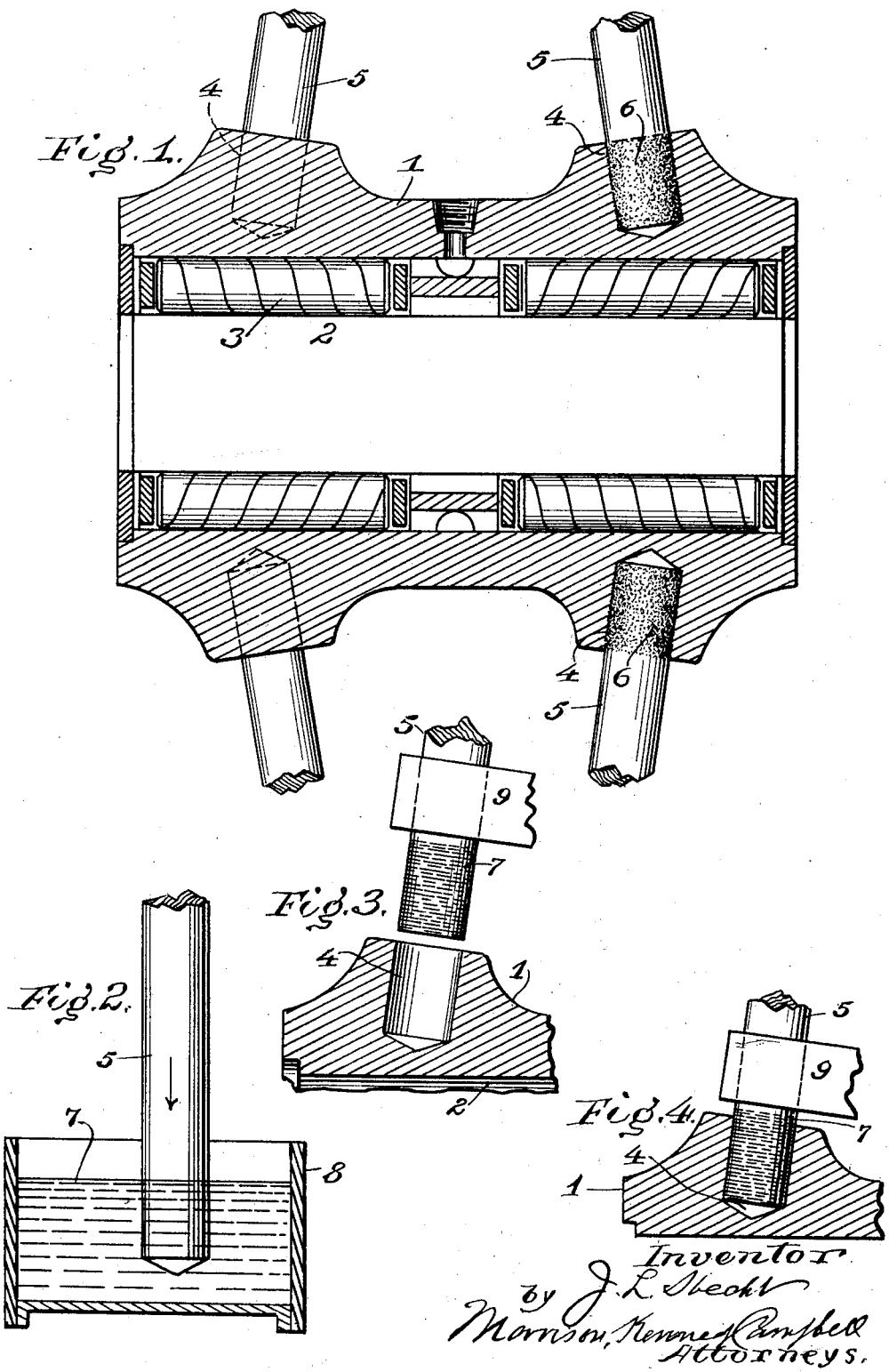

Patented Nov. 10, 1931

1,831,661

UNITED STATES PATENT OFFICE

JOSEPH L. HECHT, OF DAVENPORT, IOWA, ASSIGNOR TO FRENCH & HECHT, INCORPORATED, A CORPORATION OF IOWA

METHOD OF MAKING METAL WHEELS

Application filed February 4, 1930. Serial No. 425,759.

This invention relates to the method of making metal wheels, and is concerned more particularly with the fastening of the spokes in the hub, with a view to bringing about a solid, firm and durable connection of these parts.

In certain types of metal wheels, the holes or sockets to receive the ends of the spokes, are extended clear through the hub wall or shell to the central bore or bearing chamber, and the spokes are fastened in place by the formation of heads on their inner ends within the central chamber and cooperating with shoulders on the spokes bearing against the outer side of the hub. This construction has been the cause of some trouble, due to the leakage of oil through the spoke holes and around the spoke ends therein, in cases where the oil is applied to the hub bearing under high pressure, which has now become the practice in many cases. This objection has been avoided by fastening the spokes in holes or sockets in the hub which do not extend through the hub wall, or in other words, which have closed bottoms, and the practice is to provide spokes which will fit such holes rather snugly and to effect the fastening of the spoke by forcing the end of the same into the hole or socket while subjecting said end to longitudinal pressure sufficient to upset or enlarge the same, whereby it will be caused to tightly fill the socket and be held firmly therein, such operation being performed either with the parts cold, or under conditions of heat.

The present invention has to do with this method of fastening the spokes in the hub and with the structure produced thereby, and the invention consists in treating either the end of the spoke or the interior of the socket which is to receive the spoke end, in such manner and before the spoke is fastened in place, as to promote rust or corrosion of the treated surface, with the result that the corrosive action following the fastening of the spoke ends, will serve to more effectually hold the spoke in its socket, and will produce a firm and solid connection of the parts, far more reliable and effective than the manner of connecting these parts as heretofore practiced.

In the specification to follow, the invention will be described in detail, and the novel features thereof will be pointed out in the appended claims.

In the accompanying drawings:

Fig. 1 is a longitudinal sectional elevation through a wheel hub and connected spokes, having my invention embodied therein;

Figs. 2, 3 and 4 are views illustrating the successive steps in the preferred manner of practicing the improved method.

Referring to the drawings—

As shown in Fig. 1, a metal hub 1, provided with a central bore or chamber 2, which is shown in the present instance as equipped with a roller bearing 3, has formed in its outer side and at suitable intervals therearound, two series or rows of holes or sockets 4, which terminate at their inner ends some distance short of the central chamber 2, and whose bottoms are therefore closed, so that the sockets have no communication with said chamber. The inner ends of metal spokes 5 extend in the sockets, and are enlarged or upset so as to tightly fill the same, whereby the spokes are fastened to the hub; and in accordance with the present invention, the inner ends of the spokes within the sockets are corroded, as shown at 6, where they contact with the interior of the sockets, whereby the spokes are held the more firmly in the sockets, and a very rigid and solid connection between the spokes and the hub is secured, which is less liable to become loose than in cases where reliance alone is placed on the connection of said parts by the mere compression of the spoke into the socket without the employment of extraneous fastening means.

In carrying the improved method into effect in producing a wheel with the spokes connected as above described, the spoke end which is to seat in the socket in the hub is made of a size to enter said socket, and before inserting the spoke end in the said socket, said end, or as an alternative the interior of the socket, but preferably the spoke end, is treated with a substance which will have the effect of producing or promoting corrosion of the metal, so that the corrosive action ensuing after the filling of the socket by the spoke end, will act the more firmly and securely to hold said parts together.

In Fig. 2 the spoke is shown as having its end dipped in a treating substance 7 contained in a tank or receptacle 8, which substance may be water, or a diluted solution of ammonia, or various weak acid solutions, such as hydrochloric acid, sulphuric acid, or other acids, or various of the weaker vegetable acids, all of which substances or solutions, and others not necessary to here enumerate, will have the effect of bringing about a condition which will favor or produce corrosion or rust of the iron. After receiving a coat of the treating solution or substance, the treated end of the spoke is inserted in the spoke socket and pressed therein by force acting longitudinally of the spoke, which may be effected by means of a clamp 9 applied to the spoke adjacent the socket, and moved toward the hub as shown in Fig. 4; or the spoke may be held firmly and the hub moved up to it with the same results. The effect of either of these two operations will be to upset or enlarge the end of spoke within the socket, and thereby cause the spoke material to tightly fill the socket as hereinbefore explained. After a period of time following the seating of the end of the spoke in this manner, which period will vary more or less according to the character of the metal and the character of the treating solutions and other conditions, the treated surface of the spoke will corrode, as best shown at the right in Fig. 1, and will become firmly cemented to and will unite with the contacting surface of the interior of the socket, with the result that the spoke will be secured in the socket with a very firm and tenacious hold.

Instead of treating the end of the spoke as above specifically described, to promote corrosion of its surface, it will be manifest that good results may be secured by similarly treating the inner surface of the socket, although this may not be done with the same facility or speed as the treatment of the spoke; and it will be understood therefore, that the invention is not limited to the exact method of procedure outlined, except in so far as such limitations are expressed in the claims.

With the spokes connected to the hub as above described, a solid and firm union of the parts will be produced, and a more reliable and durable connection will manifestly result than the mere joining of the parts as heretofore practiced without the additional cementing action resulting from the corrosion of the treated parts.

Having thus described my invention, what I claim is:

1. The method of fastening metal spokes in metal hubs, which consists in providing the hub with holes or sockets to receive the ends of spokes, providing spokes to enter said sockets, treating the surface of one of the parts with a suitable agent to promote corrosion thereof, and forcing the end of a spoke into a socket while subjecting the spoke to longitudinal pressure to cause it to closely fill the socket; whereby the corrosion of the treated surface will serve to hold the spoke tightly and solidly in the socket.

2. The method of fastening metal spokes in metal hubs, which consists in providing the hub with holes or sockets to receive the ends of spokes, providing spokes to enter said sockets, treating the surface of one of the parts with a reagent which will chemically react with the metal in producing corrosion or rust, and forcing the end of a spoke into a socket while subjecting the spoke to longitudinal pressure to cause it to closely fill the socket; whereby the corrosion of the treated surface will serve to hold the spoke end tightly and solidly in the socket.

3. The method of fastening metal spokes in metal hubs, which consists in providing the hub with holes or sockets to receive the ends of spokes, providing spokes whose cross sectional dimensions at their ends will enter said sockets, treating the ends of the spokes with a suitable agent to promote surface corrosion thereof, and forcing the treated end of a spoke into a socket while subjecting said end to longitudinal pressure to cause it to closely fill the socket; whereby the surface corrosion of the end of the spoke will serve to hold the same tightly and solidly in the socket.

In testimony whereof, this specification has been duly signed by:

JOSEPH L. HECHT.